United States Patent [19]

Lombardi et al.

[11] Patent Number: 4,656,634

[45] Date of Patent: Apr. 7, 1987

[54] SKEW INSENSITIVE FAULT DETECT AND SIGNAL ROUTING DEVICE

[75] Inventors: Steven A. Lombardi, Waukesha, Wis.; David O. Potter, Lake Villa, Ill.

[73] Assignee: Motorola, Inc., Schaumburg, Ill.

[21] Appl. No.: 745,341

[22] Filed: Jun. 14, 1985

[51] Int. Cl.⁴ ................................................ G06F 11/20

[52] U.S. Cl. ........................................... 371/68; 371/1; 371/8

[58] Field of Search ................ 371/1, 8, 68; 324/73 R

[56] References Cited

U.S. PATENT DOCUMENTS

| | | | |
|---|---|---|---|
| 3,927,392 | 12/1975 | Caron | 371/68 |
| 4,032,757 | 6/1977 | Eccles | 371/68 X |
| 4,122,995 | 10/1978 | Franke | 371/1 |
| 4,234,956 | 11/1980 | Adderley et al. | 371/8 X |
| 4,354,270 | 10/1982 | Nuding | 371/68 |
| 4,477,895 | 10/1984 | Casper et al. | 371/8 X |
| 4,542,505 | 9/1985 | Binoeder et al. | 371/1 |

*Primary Examiner*—Charles E. Atkinson
*Attorney, Agent, or Firm*—Steven G. Parmelee

[57] ABSTRACT

This invention relates to a fault detect and signal routing device that may be used to monitor and control redundant signals. The invention includes an input/output unit (11) for receiving the redundant signals and an output for outputting one of the signals. The input/output unit (11) also provides logic signals that relate to the received signals. A fault inhibit unit (12) receives the logic signals and provides outputs that relate thereto to a time delay unit (13), a fault detect unit (14), and a signal route control unit (16). The fault detect unit (14) serves to compare signals from the time delay unit (13) and the fault inhibit unit (12) to determine if certain kinds of signal faults have occurred. If one has, the fault detect unit (14) provides fault signal. The signal route control unit (16) receives the input signals and the signals from the fault inhibit unit (12) and provides a control signal to the input/output unit (11) to control which input signal is provided to the output.

16 Claims, 6 Drawing Figures

SKEW INSENSITIVE FAULT DETECT AND SIGNAL ROUTING DEVICE

TECHNICAL FIELD

This invention relates generally to redundant signal processing.

BACKGROUND ART

Many electronic systems interface with one or more external components to effectuate their purpose. Often, such external components are sensors that respond electrically to some preselected monitored event. In some systems, assured receipt of accurate sensor information can be critical to overall operation of the system. For instance, electronic engine controls as used to control internal combustion engines require accurate and timely engine position information. Cam position or flywheel position sensors are utilized to provide an electric signal that relates to the position of the relevant engine component. If the sensor fails, however, the electronic engine control will typically not operate effectively. Hence, loss of the sensor signal can be highly disabling.

To mitigate this sensitivity, redundant sensors are often used when lack of sensor information might significantly disable a system. This solution, however, gives rise to a new problem. The system receiving the redundant signals must be able to decide which sensor input to use and must further have some means of determining when and if sensor information appears unreliable to the extent that the data should be ignored.

Pursuant to one prior art solution to the latter problem, the system will use the information from one sensor as a default condition, while simultaneously monitoring a second redundant sensor signal (see FIG. 3). If and when the first sensor fails to provide a signal at the same time that the second sensor provides a signal (for example, see FIG. 6), the system will presume a fault on the first sensor line and utilize instead the signal from the second sensor.

Unfortunately, the above solution gives rise to yet another problem. Redundant signals often exhibit skew; that is, the leading and trailing edges of the redundant signals may vary from one another in time (for example, see FIG. 4). If such skew occurs, the prior art technique may conclude that a fault condition exists when in fact it does not.

There therefore exists a need for a device that can process redundant signals and provide an appropriate output based thereon. This device should monitor all signal inputs for fault conditions, and should have logic capabilities that enable the device to use only inputs that have not faulted. Further, such a device should have a degree of skew insensitivity to prevent at least some unnecessary fault condition responses. The degree of insensitivity should be selectively variable. Finally, such a device should be relatively inexpensive to manufacture and implement, and reliable in operation.

SUMMARY OF THE INVENTION

The above needs are substantially met by provision of a fault detect and signal routing device that includes an input/output unit, a time delay unit, a fault detect unit, and a signal route control unit. The input/output unit has at least two inputs for receiving input signals, and a first output to which one of the input signals can be selectively routed. The input/output unit also includes other outputs for providing logic signals that relate to the input signals.

The time delay unit receives the logic signals from the input/output unit and provides a delayed output signal in response thereto. The fault detect unit also receives the logic signals, and further receives the delayed output signal from the time delay unit. The fault detect unit then operates to provide a fault signal whenever the logic signals are not present substantially simultaneously with the delayed output signal.

The signal route control unit receives a logic signal from the input/output unit and provides a control signal to the input/output unit to control which input signal the input/output unit routes to its first output.

By provision of the above described device, redundant signals can be provided to the input/output unit, with one of these signals being routed to the first output for subsequent use external to the device. The signal route control unit determines which input signal will be connected to the output as a function of fault conditions that may exist with respect to the input signals. The fault signal can be used as desired. For instance, the fault signal can be used as an interrupt signal in an appropriate system.

In another embodiment of the invention, the input/output unit can include a fault inhibit unit that provides the logic signals described above, providing certain predetermined fault conditions do not exist. More particularly, certain input signal fault conditions will cause the fault inhibit unit to inhibit transmission of the logic signal to the time delay unit and fault detect unit, and hence prevent incorrect processing based on certain categories of faulty data.

In yet another embodiment of this invention, the device can include a reset unit that receives the delayed output signal from the time delay unit, and that provides a reset signal to the time delay unit and the fault inhibit unit to ready these components for subsequent signal processing.

Through use of this device, redundant signals can be utilized with some degree of skew between the signals being irrelevant to the proper functioning of the device. This degree of insensitivity can be selected by controlling the duration of time delay provided by the time delay unit. The longer the duration, the greater the insensitivity to skew, whereas the shorter the duration, the greater the sensitivity to skew.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
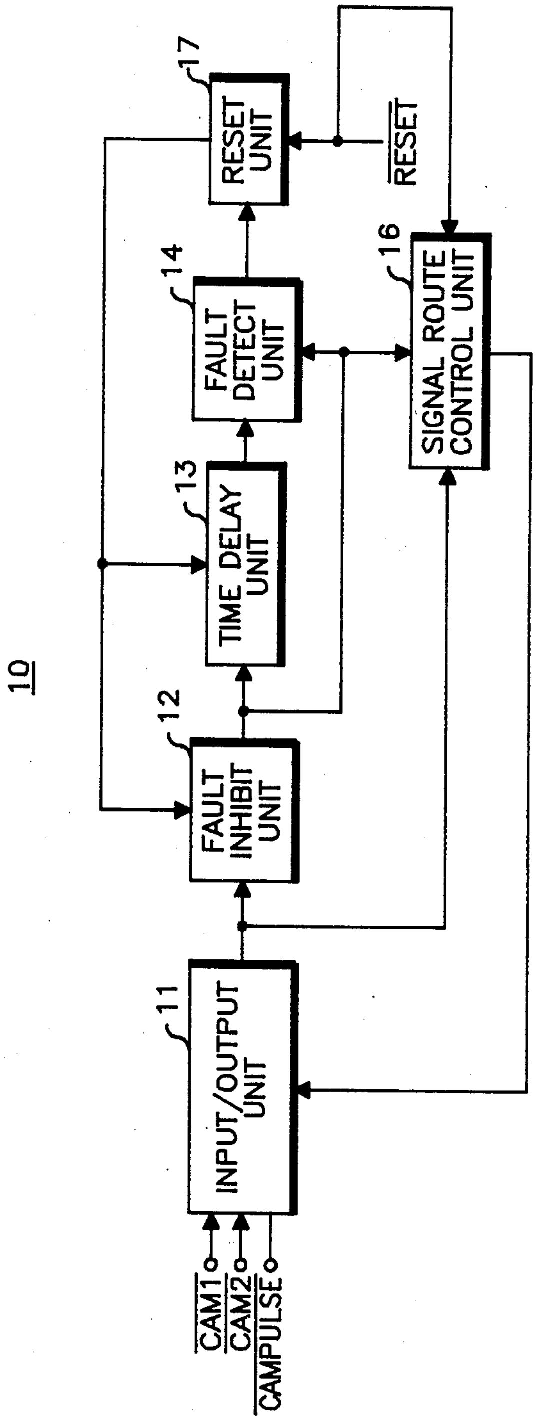
FIG. 1 comprises a block diagram view of the device.
Figure 2:
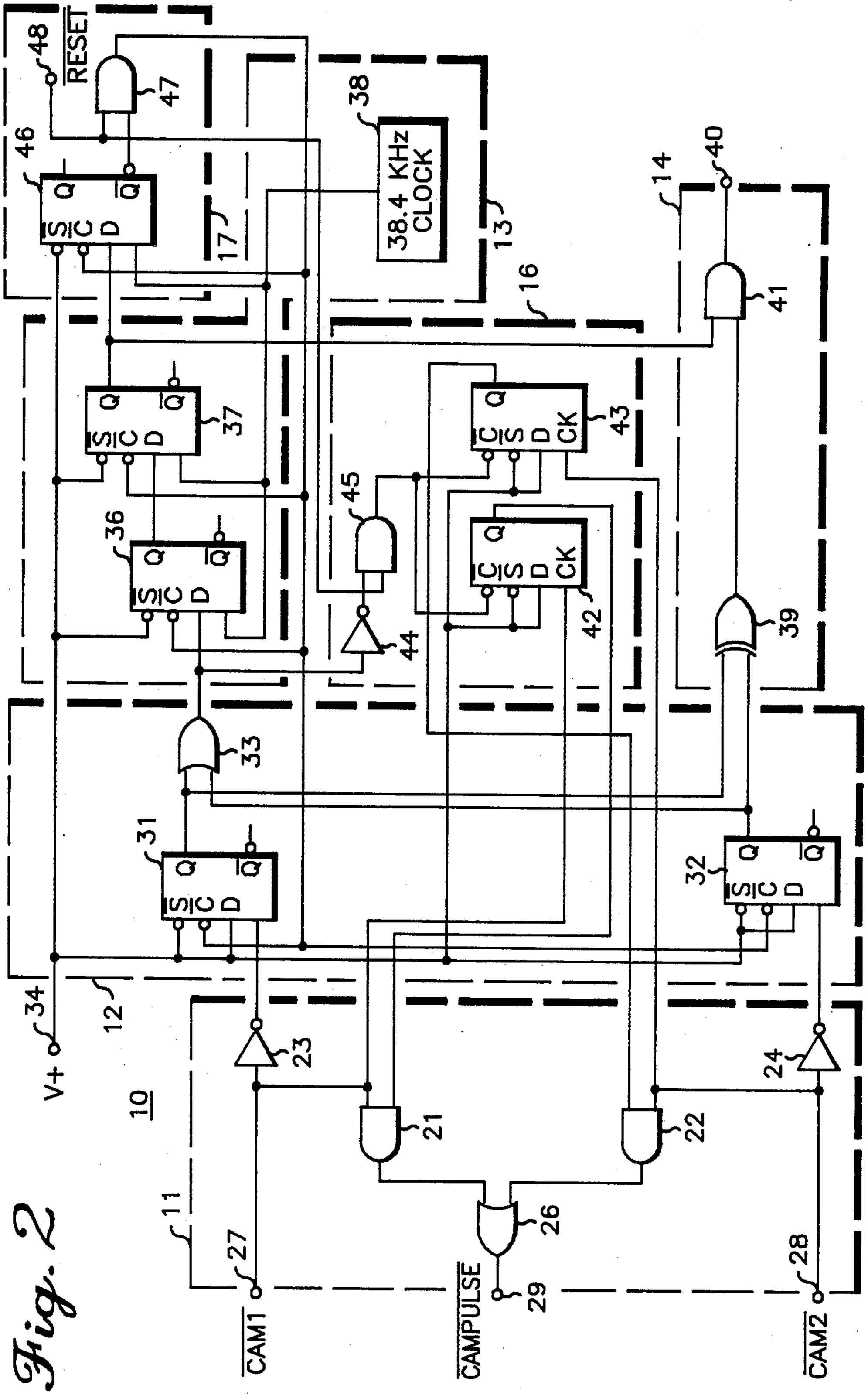
FIG. 2 comprises a schematic diagram of the device.

Referring now to the drawings, and in particular to FIG. 1, the device can be seen as depicted generally by the numeral 10. The device (10) includes generally an input/output unit (11), a fault inhibit unit (12), a time delay unit (13), a fault detect unit (14), a signal route control unit (16), and a reset unit (17). Each of these generally referred to components will now be described in more detail in seriatim fashion Referring now to FIG. 2, the input/output unit (11) includes a first and second two input AND gate (21 and 22) (as provided through use of a 74F08), a first and second inverter (23 and 24) (as provided through use of a 74F04), and a two input OR gate (26) (as provided through use of a 74F32). The input/output unit (11) also has first and second inputs (27 and 28) and a first output (29). The first input (27) connects to the first inverter (23) to one input of the first AND gate (21), and the signal route control unit (16) as described below. The second input (28) connects to the second inverter (24), to one input of the second AND gate (22), and to the signal route control unit (16) as described below. The outputs of both AND gates (21 and 22) connect to the two inputs of the OR gate (26). The output of the OR gate (26) provides the first output (29) of the input/output unit (11). In addition, logic signal outputs are provided at the output of both inverters (23 and 24) as described below. Other connections between the input/output unit (11) and other components in the device (10) will be described where appropriate below.

The fault inhibit unit (12) includes two D type flip-flops (31 and 32) (as provided through use of a 74F74) and a two input OR gate (33) (as provided through use of a 74F32). Each flip-flop (31 and 32) is of the type wherein the signal appearing at the data input port will be provided at the Q output port every time a positive going edge transition appears at the clock port.

The output of the first inverter (23) of the input/output unit (11) connects to the clock input port of the first flip-flop (31). The data port and the set port of the first flip-flop (31) are connected to a positive voltage source (34). The clear port connects to the reset unit (17) as described in more detail below. The Q output port connects to one input of the OR gate (33) and also to the fault detect unit (14) as described in more detail below.

The output of the second inverter (24) of the input/output unit (11) connects to the clock port of the second flip-flop (32). The set and data ports connect to a positive voltage source (34). The clear port connects to the reset unit (17) as described in more detail below. The Q output port (9) connects to the remaining input of the OR gate (33) and also to the fault detect unit (14) as described in more detail below.

The time delay unit (13) includes two D type flip-flops (36 and 37) (again as provided through use of 74F74s) and a 38.4 kHz clock pulse source (38). The data port of the first flip-flop (36) connects to the output of the two input OR gate (33) described above with respect to the fault inhibit unit (12). The clear port connects to the reset unit (17) as described below. The set port connects to a positive voltage source (34). The Q output port connects to the data port of the second flip-flop (37). The set port of the second flip-flop (37) connects to a positive voltage source (34). The clear port connects to the reset unit (17) as described below in more detail.

The clock ports of the two flip-flops (36 and 37) connect to a 38.4 kHz clock source (38). Such clock sources are well known in the art and hence no more detailed description of the clock source need be provided here.

Finally, the Q output port of the second flip-flop (37) connects to the reset unit (17) and the fault detect unit (14) as described in more detail below.

The fault detect unit (14) includes an exclusive OR gate (39) (as provided through use of a 74F86) and a two input AND gate (41) (as provided through use of a 74F08). One input of the exclusive OR gate (39) connects to the Q output port of the first flip-flop (31) described above with respect to the fault inhibit unit (12). The remaining input to the exclusive OR gate (39) connects to the Q output port of the second flip-flop (32) described above with respect to the fault inhibit unit (12).

One input of the fault detect unit AND gate (41) connects to the Q output port of the second flip-flop (37) described above with respect to the time delay unit (13). The remaining AND gate input connects to the output of the exclusive OR gate (39). The output of the AND gate provides a fault signal output (40), which may be provided to an interrupt port of an associated peripheral unit, as explained below in more detail.

The signal route control unit (16) includes two D type flip-flops (42 and 43) (as provided through use of a 74F74), an inverter (44) (as provided through use of a 74F04), and a two input AND gate (45) (as provided through a use of a 74F08).

The clock port of the first flip-flop (42) connects to the first input (27) of the input/output unit (11). Similarly, the clock port for the second flip-flop (43) connects to the second input (28) of the input/output unit (11). The data and set ports of both flip-flops (42 and 43) connect to the positive voltage source (34). The clear ports of both connect to the output of the two input AND gate (45). The Q output port of the first flip-flop (42) connects to the remaining input of the first input/output unit AND gate (21), and the Q output port of the second flip-flop (43) connects to the remaining input of the second input/output unit AND gate (22).

One input of the signal route control unit AND gate (45) connects to the reset unit (17) as described below, and one connects to the output of the invertor (44). The input of the invertor (44) connects to the output of the fault inhibit unit OR gate (33).

Finally, the reset unit (17) includes a D type flip-flop (46) (as provided through use of a 74F74) and a two input AND gate (47) (as provided through use of a 74F08). The set port of the flip-flop (46) connects to a positive voltage source (34). The clear port connects to an output of the reset unit (17) as described further below. The data port connects to the Q output port of the second time delay unit flip-flop (37). The clock port connects to the 38.4 kHz clock source (38) described above. The $\overline{Q}$ port connects to one input of the two input AND gate (47).

The remaining input to the AND gate (47) connects to receive a reset signal at a reset signal input port (48), which input port (48) also connects to an input of the signal route control unit AND gate (45). The output of the reset unit AND gate (47) connects to all of the remaining flip-flops described above (31, 32, 36, 37, and 46).

For purposes of describing the operation of the device (10), it may be assumed that the signals appearing at the two inputs (27 and 28) of the input/output unit (11) are redundant signals. More particularly, it will be assumed that the signals are cam position signals, with the signal appearing at the first input port (27) being a CAM1 signal as provided by a first cam position sensor, and the signal appearing at the second input port (28) being a CAM2 signal as provided by a second cam position sensor. It should further be noted that, for purposes of explaining the operation of the device (10), a high CAM1 or CAM2 signal relates to an absence of the sensed condition, and a low CAM1 or CAM2 signal relates to a sensing of the monitored parameter. It will be further assumed that at least a few cycles of signal information will have already occurred prior to the specific waveform descriptions set forth below.

Operation of the device (10) can now be described.

Figure 3:
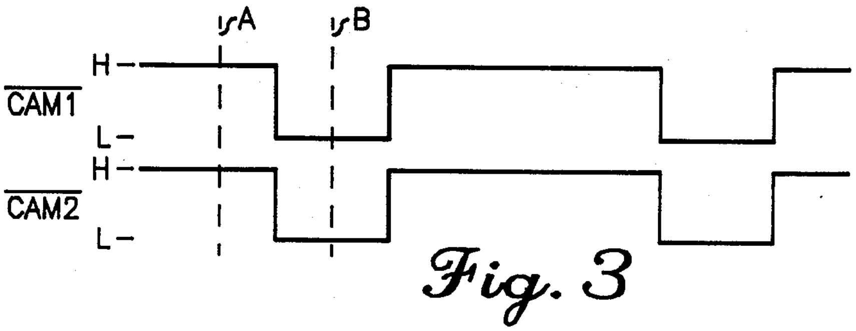
FIG. 3 comprises a waveform depiction of two redundant input signals.

Presuming that the CAM1 and CAM2 pulses remain substantially in synchronism with one another (as shown in FIG. 3), both signals will eventually go low together (reference character B in FIG. 3. When this occurs, a low signal will be applied to one input of the input/output unit AND gates (21 and 22) and to the clock ports of both signal route control unit flip-flops (42 and 43). As a result, both flip-flops (42 and 43) will provide low signal outputs. The two input/output unit AND gates (21 and 22) will therefore each provide a low signal to the OR gate (26) such that a low CAM PULSE signal correctly results.

The input/output unit invertors (23 and 24) invert the low signals from the inputs (27 and 28) to provide a rising edge transition to the clock ports of both fault inhibit unit flip-flops (31 and 32) to thereby cause a high signal to appear momentarily at the Q outputs thereof. These high signals are each applied to the fault inhibit unit OR gate (33) and the fault detect unit exclusive OR gate (39). As a result, the OR gate (33) provides a high output signal and the exclusive OR gate (39) provides a low output signal.

The high signal from the OR gate (33) appears at the data port of the first time delay unit flip-flop (36). With the next rising edge transition from the clock source (38), this high signal becomes transferred to the Q output port thereof for subsequent provision to the data port of the second time delay unit flip-flop (37). The high signal then appears at the Q output port of the second flip-flop (37) with the next clock pulse.

This high signal then appears at one input of the fault detect unit AND gate (41). The remaining input for this AND gate (41) receives the low signal from the exclusive OR gate (39), with a low signal resulting as the fault signal at the output of the AND gate (41).

Figure 4:
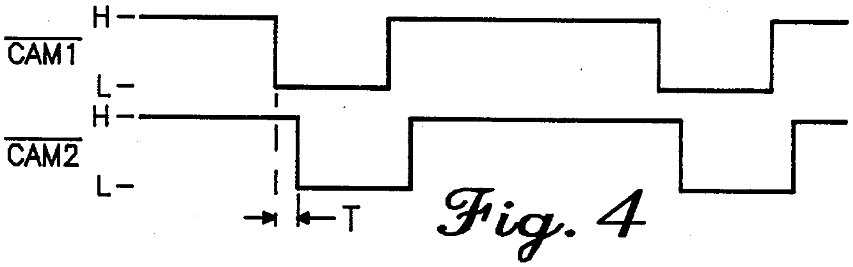
FIG. 4 comprises a waveform diagram of two redundant input signals skewed in time from one another.

The fault detect unit AND gate (41) compares the above noted signals only after both time delay flip-flops (36 and 37) have completed their processing of the incoming signals, which, with the 38.4 kilohertz clock source (38) noted, requires 50 microseconds. This time delay will therefore provide 50 microseconds of skew insensitivity. For instance, if the CAM1 and CAM2 signals were skewed 50 microseconds or less (see FIG. 4), the fault detect signal would not be altered because by the time the time delay unit (13) provides its signal to the fault detect unit (14), the CAM1 and CAM2 inputs (27 and 28) will be receiving identical signals, and hence the exclusive OR gate (39) will be providing a low signal to the AND gate (41). On the other hand, a skew of greater than 50 microseconds will cause the creation of a fault signal during the relevant time frame. The duration of delay introduced by the time delay unit (13), and hence the sensitivity of the device (10) to signal skew, can be selected by appropriately including yet additional flip-flop stages or by selecting other clock rates for use with the flip-flops.

Figure 5:
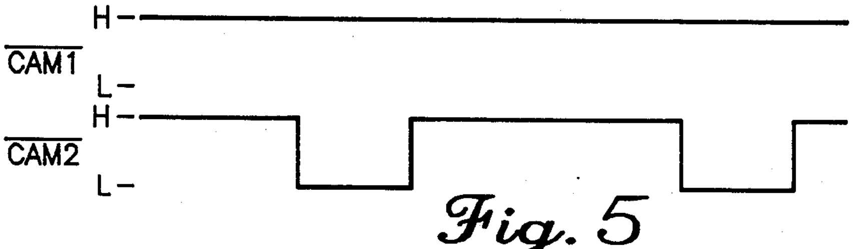
FIG. 5 comprises a waveform diagram of two redundant input signals wherein the first input signal has faulted high.

The situation will now be considered where the CAM1 signal faults high, while the CAM2 signal operates as before (see FIG. 5). With continued reference to FIG. 2, the first input (27) continually receives a high signal while the second input (28) receives either a high or a low signal. For purposes of example, it will be assumed that the CAM2 signal has just fallen low. The CAM1 input (27) causes a high signal to be continually provided to the first input/output unit AND gate (21) and to the clock port of the first signal route control unit flip-flop (42). The invertor (23) causes a low signal to be applied to the clock port of the first fault inhibit unit flip-flop (32). As a result, the CAM1 signal does nothing to begin the time delay function, and since the first signal route control unit flip-flop (42) will continually provide a low output, the first input/output unit AND gate (21) will provide only a low output to the input/output unit OR gate (26).

The CAM2 signal will be low, thereby providing a low signal to the second input/output unit AND gate (22) and to the clock input of the second signal route control unit flip-flop (43). As a result, the second input-/output unit AND gate (22) will receive two low inputs, and therefore provide a low output to the input-/output unit OR gate (26), thereby providing a low CAMPULSE output that corresponds with the CAM2 input and not the CAM1 input.

Both a low and a high signal are applied to the OR gate (33) of the fault inhibit unit (12) and to the exclusive OR gate (39) of the fault detect unit (14). Therefore, both of the latter components (33 and 39) provide a high output. The high output of the OR gate (33) will cause the two flip-flops of the time delay unit (13) to operate as described above to provide a high signal to the fault detect unit AND gate (41) after 25 microseconds. The exclusive OR gate (39) will also be providing a high signal to the AND gate (41), such that the AND gate (41) will output a high fault signal, thereby indicating that a fault condition has occurred during the relevant time frame.

The signal route control unit (16) therefore responds to effectively route the CAM2 signal to the CAM PULSE output as described above when a fault has occurred with respect to the CAM1 signal. Further, the fault detect unit (14) responds to the fault condition by providing a fault signal that can be used as an interrupt signal if desired.

Much the same will occur if the CAM2 signal fails high, and the CAM1 signal continues to operate correctly. The fail detect unit (14) will again provide a high fault signal, and the signal route control unit (16) will cause the CAM1 signal to be routed to the CAMPULSE output (20).

Figure 6:
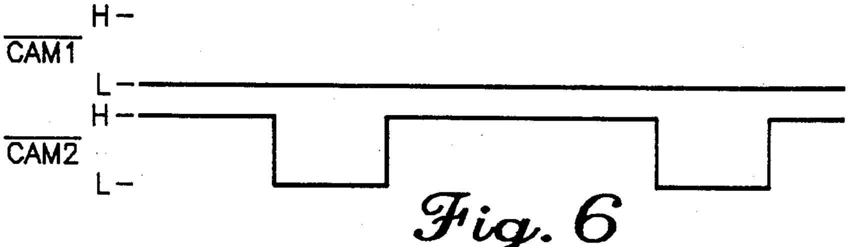
FIG. 6 comprises a waveform diagram of two redundant input signals wherein the first input signal has faulted low.

The situation will now be considered where the CAM1 signal faults low, while the CAM2 signal operates as before (see FIG. 6). With continued reference to FIG. 2, the first input (27) continually receives a low signal while the second input (28) receives either a high or a low signal. For purposes of example, it will be assumed that the CAM2 signal has just risen high.

The CAM1 input (27) causes a low signal to be continually provided to the first input/output unit AND gate (21) and to the clock port of the first signal route control unit flip-flop (42). The inverter (23) causes a high signal to be continually applied to the clock port of the first fault inhibit unit flip-flop (31) (the continual nature of this signal is important because the output of this flip-flop (31) will not change unless and until a rising edge transition is received at the clock port). As a result, the $\overline{CAM1}$ signal does nothing to begin the time delay function, and since the first signal route control unit flip-flop (42) will continually provide a low output under these circumstances, the first input/output unit AND gate (21) will continually provide only a low output to the input/output unit OR gate (26).

The $\overline{CAM2}$ signal will be high, thereby providing a high signal to the second input/output unit AND gate (22) and to the clock input of the second signal route control unit flip-flop clock input of the second signal route control unit flip-flop (43). As a result, the second input/output unit AND gate (22) will receive two high inputs, and therefore will provide a high output to the input/output unit OR gate (26). This will ensure a high $\overline{CAMPULSE}$ output that corresponds with the $\overline{CAM2}$ input and not with the $\overline{CAM1}$ input.

Since only low signals will be provided to the fault detect unit exclusive OR gate (39) under these conditions, a low fault signal will be provided at the output of the fault detect unit AND gate (41). In other words, no fault condition will be sensed by the fault detect unit (14). This does not constitute a serious problem, because the operating signal is high, and hence it can be assumed that the cam position to be sensed is not then currently present. When the cam position is sensed, the output of the fault detect unit (14) will again be high, and this signal can be used as an interrupt signal as desired.

Although no fault condition is sensed by the fault detect unit (14) under the circumstances set forth above, the existence of this particular fault cannot incorrectly influence the output of the device (10) because the flip-flops (31 and 32) of the fault inhibit unit (12) prevents this from happening.

Those skilled in the art will recognize numerous modifications of the above described invention that would not depart from the spirit of the invention, and hence the inventors wish to make it clear that the scope of the claims should not be considered as limited only to the embodiments set forth, except to the extent that the claims contain specific limitations to this effect.

We claim:

1. A fault detect and signal routing device comprising:
   - (a) input/output means having:
     - (i) at least two inputs for receiving at least first and second input signals;
     - (ii) a first output to which one and only one of said input signals can be selectively individually routed; and,
     - (iii) a plurality of additional outputs for providing at least first and second logic signals related to said first and second input signals respectively;
   - (b) time delay means for receiving signals related to said logic signals, and for providing a delayed output signal in response thereto;
   - (c) fault detect means for receiving signals related to said logic signals and for receiving said delayed output signal, and for providing a fault signal when one of said logic signals is present and another of said logic signals is not present when said delayed output signal is present; and
   - (d) signal route control means for receiving said first and second input signals and for receiving at least one of said logic signals, for providing control signals to said input/output means to control which of said input signals is routed to said first output.

2. The fault detect and signal routing device of claim 1 wherein said first and second input signals are substantially identical to one another.

3. The fault detect and signal routing device of claim 2 wherein said first and second input signals relate to position of an engine component.

4. The fault detect and signal routing device of claim 1 wherein said time delay means includes at least a first and second flip-flop.

5. The fault detect and signal routing device of claim 4 wherein each of said flip-flops is a D type flip-flop, wherein a signal appearing at a data port thereof will not be transferred to an output port thereof until a predetermined edge transition appears at a clock port thereof.

6. The fault detect and signal routing device of claim 5 wherein an output of said first flip-flop connects to a data input port of said second flip-flop.

7. The fault detect and signal routing device of claim 6 wherein said flip-flops have a common clock signal source.

8. The fault detect and signal routing device of claim 1 and further including fault inhibit means for receiving said logic signals, for providing said signals related to said logic signals to said time delay means and to said fault detect means, and for providing a signal to said signal route control means for preventing said signal route control means from incorrectly responding to at least some fault conditions.

9. The fault detect and signal routing device of claim 8 wherein said fault inhibit means includes a first and second D type flip-flop, the inputs of which are operably connected to receive said logic signals, and the outputs of which are operably connected to said time delay means, said fault detect means, and said signal route control means.

10. The fault detect and signal routing device of claim 9 wherein said flip-flops are of the type that will transfer a signal from a data input thereof to an output thereof in response to receiving a predetermined edge transition at a clock input thereof.

11. The fault detect and signal routing device of claim 1 wherein said fault detect unit includes an exclusive OR gate.

12. The fault detect and signal routing device of claim 1 and further including reset means for receiving said delayed output signal, and for providing a reset signal to at least said time delay unit in response thereto.

13. A fault detect and signal routing device comprising:
   - (a) input/output means having:
     - (i) at least two inputs for receiving at least first and second input signals;
     - (ii) a first output to which said input signals can be selectively individually routed; and
     - (iii) a plurality of additional outputs for providing at least first and second logic signals related to said first and second input signals, respectively;
   - (b) time delay means for receiving signals related to said logic signals, and for providing a delayed output signal in response thereto;
   - (c) fault detect means for receiving said logic signals and for receiving said delayed output signal, and for providing a fault signal when one of said logic signals is present and another of said logic signals is not present when said delayed output signal is present;

(d) signal route control means for receiving said first and second input signals and for receiving at least one of said logic signals, for providing control signals to said input/output means to control which of said input signals is routed to said first output; and (e) fault inhibit means for receiving said first and second logic signals, for providing signals related to said logic signals to said time delay means and to said fault detect means, and for providing a signal to said signal route control means for preventing said signal route control means from incorrectly responding to at least some fault conditions.

14. The fault detect and signal routing device of claim 13 wherein said first and second input signals are substantially identical to one another.

15. The fault detect and signal routing device of claim 13 wherein said time delay means includes at least a first and second flip-flop.

16. The fault detect and signal routing device of claim 15 wherein each of said flip-flops is a D type flip-flop, wherein a signal appearing at a data port thereof will not be transferred to an output port thereof until a predetermined edge transition appears at a clock port thereof.

* * * * *